Dec. 31, 1935. J. L. ROWTON 2,026,251

FISH DRESSING MACHINE

Filed Feb. 27, 1932  2 Sheets-Sheet 1

Inventor:
John Leslie Rowton
By Williams, Bradbury,
McCaleb & Hinkle
Attys.

Dec. 31, 1935.  J. L. ROWTON  2,026,251
FISH DRESSING MACHINE
Filed Feb. 27, 1932  2 Sheets-Sheet 2
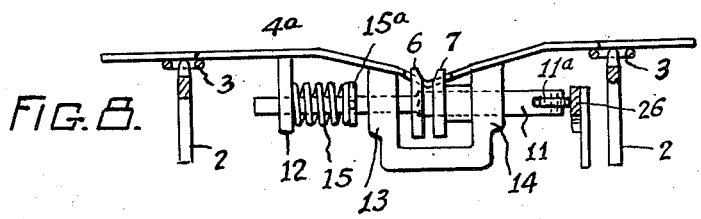
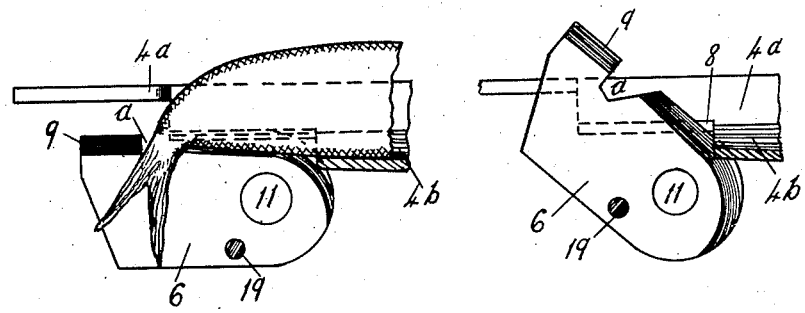
Fig. 5.  Fig. 6.
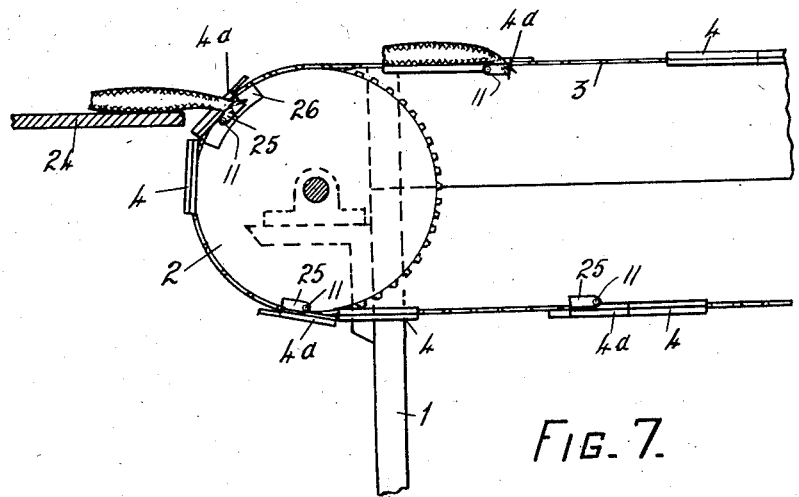
Fig. 7.
Inventor:
John Leslie Rowton
By Williams, Bradbury,
McCaleb & Hinkle
Attys Patented Dec. 31, 1935

2,026,251

UNITED STATES PATENT OFFICE 2,026,251

FISH-DRESSING MACHINE

John Leslie Rowton, Aberdeen, Scotland

Application February 27, 1932, Serial No. 595,466
In Great Britain February 28, 1931

15 Claims. (Cl. 17—3)

This invention relates to machines for boning, cleaning filleting, gutting, scaling, splitting or otherwise preparing or dressing fish.

In fish-dressing machines employing a circular splitting knife mounted vertically above a fish conveyor, it has hitherto been found inconvenient to provide a gripping device on the conveyor for the tail of the fish which is laid with its back on the conveyor, because the knife is liable to be damaged by contact with the gripping device unless the knife is constructed to jump over the gripping device, and in consequence the knife would fail to split the fish at the extreme end of the trunk of the tail. It has therefore been usual in such machines to dispense with a tail-gripping device, and to provide the conveyor with pockets or recesses for holding the back of the fish firmly during the splitting operation.

Devices incorporated in the conveyor for gripping the tail of a fish are however known in fish-dressing machines in which the fish are carried with their sides resting on the surface of a revolving drum conveyor or with their backs in the recessed edge of a horizontal revolving table or between a pair of opposed rotary discs.

The present invention consists in a tail-gripping device for the conveyor of a fish-dressing machine where a pair of jaws mounted for movement towards and away from each other with means for opening and closing said jaws have the jaws mounted for movement to raise them out of or lower them into or below the general plane or surface of the conveyor, with means for moving said jaws together to raise and lower them in relation to the surface of the conveyor.

The invention also consists in the combination with the conveyor of a fish-dressing machine of a tail-gripping device as above defined which is normally situated at or below the general plane or surface of the conveyor, automatic means being provided for moving the tail-gripping jaws to cause said jaws to be raised out of or lowered into or below the general plane or surface of the conveyor, and automatic means being provided for opening and closing the jaws when raised.

The jaws are preferably pivoted to the conveyor at or near one of their ends to enable them to be rocked to move them into positions where they are raised out of or lowered into or below the surface of the conveyor, means being provided for rocking the jaws together about their pivotal attachment to the conveyor.

The invention furthermore consists in locating the said jaws in or beneath a slot at the base of one end of a groove, pocket or recess provided in the conveyor to receive the back of the fish, so that the upper edges of the said jaws, when lowered, are flush with the bottom of the groove or may be raised out of the slot for the purpose of opening and closing the jaws to release or engage the fish tail.

The invention also consists in a fish-dressing machine having a conveyor of the endless travelling belt type comprising a series of connected conveyor plates passing over drums, pulleys or sprocket wheels at each end of the conveyor, said plates being troughed in the direction of their travel to receive the fish and being supported along their upper run to prevent sagging, and one of the said plates having a slot in the base of its troughed portion in or through which a pair of tail-gripping jaws carried beneath said plate are adapted to move.

The conveyor plates may be carried by endless chains or their equivalent passing over the end drums or sprocket wheels. The conveyor plates may also be arranged in sets connected together with a gap or space between successive sets for the discharge of bones, offal and the like, each set corresponding in length to the length of the fish to be dressed and being provided with a pair of tail-gripping jaws movable in or through a slot in the base of the troughed portion of one of the conveyor plates at or near the end of the set.

The jaws can be automatically moved in or through the slot in the base of the slotted conveyor plate by means actuated by stationary members on the conveyor framework, the jaws being automatically opened and closed in said slot, preferably when raised in said slot, in order to release or grip the fish tail. To this end the jaws may be pivotally mounted at or near their ends beneath the slot in the tail-grip conveyor plate section, the means for actuating the jaws to rock and to open and close them being carried by said plate and cooperating with the stationary members on the conveyor framework.

The endless conveyor is preferably arranged in a horizontal position so that its upper run forms a horizontal work table and the tail-gripping jaws are preferably arranged for parallel movement towards and away from each other for closing and opening the jaws, which are preferably closed by a spring and opened by mechanical means. The conveyor can be adapted to different kinds of fish by varying the shape of the trough in the plates or by substituting different conveyor plates.

The machine is provided with knives, guides and other tools or contrivances of any known type for performing the desired dressing operations.

The accompanying drawings illustrate examples of the manner of carrying out the invention.

Figs. 5 and 6 are detail views looking on one of the tail-gripping jaws, the other jaw having been removed.

Fig. 7 is a diagrammatic longitudinal sectional view of one end of a modified form of conveyor.

Fig. 8 is a detail cross-sectional view of the jaw-opening mechanism diagrammatically indicated in Fig. 7.

Figure 1:
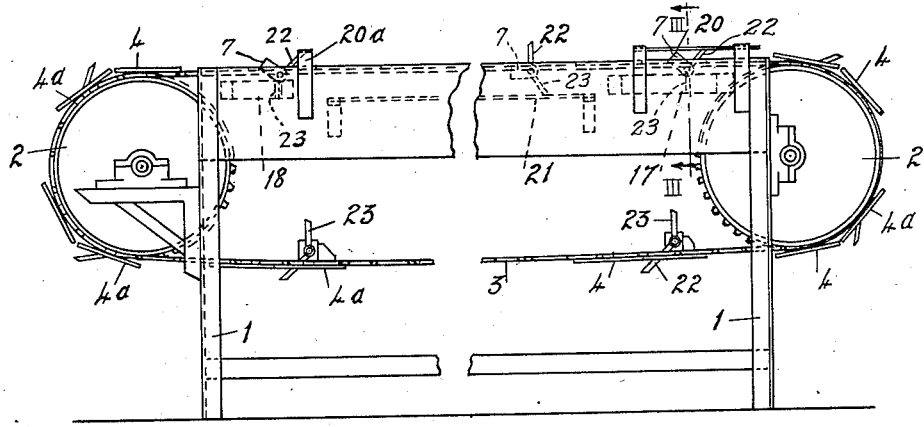
Fig. 1 is a fragmentary side elevation of one form of fish conveyor and Fig. 2 is a plan view thereof.
Figure 2:
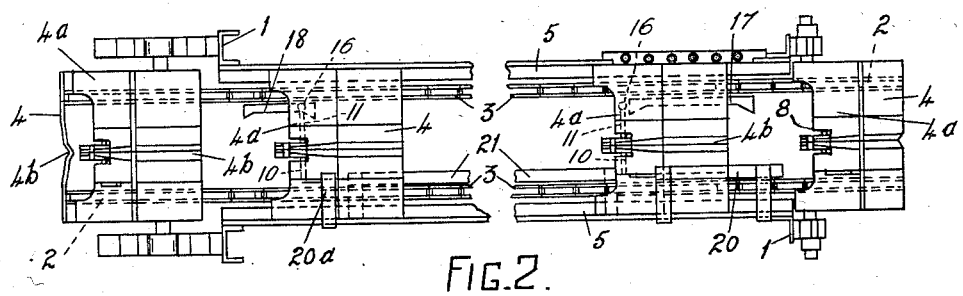
Figure 3:
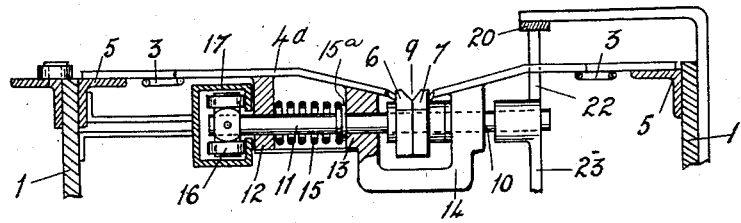
Fig. 3 is a detail cross-sectional view on the line III—III of Fig. 1 to a larger scale and Fig. 4 is a plan view of the leading conveyor plate.
Figure 4:
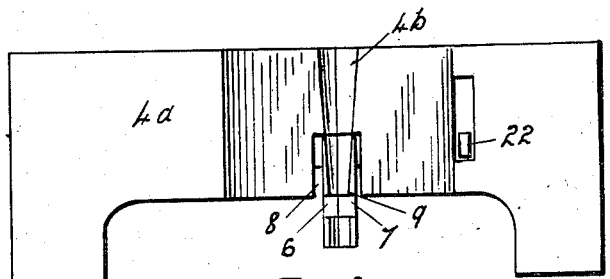

The machine, as shown in Figs. 1 and 2, comprises a framework 1 supporting a pair of sprocket wheels 2 at each end, over which pass endless chains 3 carrying conveyor plates which rest upon rest bars 5 along each side of the framework, mechanism being provided for driving the sprocket wheels. The conveyor plates are arranged in sets, each set corresponding in length to the length of the fish, thus providing a horizontal surface or table to receive the fish. As shown, each set comprises two plates 4 and 4a. The plates are troughed in the direction of travel, the base 4b of the trough being grooved to such shape or formation as to fit or conform to the shape of the fish when laid with its back therein and so as to restrain the fish from either longitudinal or lateral movement. Associated with the foremost plate 4a (or one of the leading plates of each set of conveyor plates) is a tail-gripping device comprising a pair of jaws 6 and 7 located below a slot 8 in the centre of the front edge of the troughed plate 4a. The jaws 6 and 7 fit close together side by side and may be bevelled inwards along their upper edges, as shown, to form a V-shaped recess 9 which widens out towards and merges into the groove 4b at the base of the troughed portion of the plate 4a. A notch a in each jaw (Figs. 5 and 6) accommodates the tail root of the fish. Each jaw is carried at one end of a transverse spindle 10 or 11 respectively mounted in bearings 12, 13 and 14 carried below the troughed plate 4a, the spindles 10 and 11 being in alignment with their axis situated near the rear of the jaws so that, by rocking the spindles, the front ends of the jaws can be raised through the slot 8 in the troughed plate 4a to any desired height. The jaws are pressed together by a spring or springs 15 in compression between the bearing 12 and a collar 15a on the spindle 11 and can be separated automatically, when the jaws are raised in the slot, by separating the spindles 10 and 11. For this purpose, the spindle 10 may be held against axial movement and the spindle 11, on which the jaw-closing spring 15 may be mounted, may be moved axially by the engagement of cam rollers 16 on the end of the spindle 11 with fixed hollow box-like cam tracks 17 and 18 on the conveyor framework. A pin 19 (Figs. 5 and 6) on one jaw entering a hole in the other jaw keeps the jaws in register with each other and enables both jaws to be rocked when the spindle 10 is rocked by engagement of an arm or projection 22 thereon with overhung stationary abutments or ramps 20 and 20a on the conveyor framework and by the engagement of an arm or projection 23 on the spindle 10 with an underneath ramp or abutment 21.

In operation, the conveyor plates are supported on their upper run by the rest bars 5 and the jaws are first raised from a position parallel to the bottom of the trough, groove or recess 4b in the conveyor plate 4a into a position of say approximately 45 degrees thereto, as shown in Fig. 6, this movement being effected by the arm 22 on the jaw spindle 10 striking the stationary abutment or ramp 20. Immediately thereafter, the jaws are opened by the engagement of the cam rollers 16 on the jaw spindle 11 with the fixed cam track 17. The ramp 20 is of sufficient length to ensure that the jaws 6 and 7 will be held in their elevated position for a sufficient length of time to enable the cam track 17 to open the jaws and to enable the operator to insert the fish tail between the open raised jaws. The fish tail is inserted between the jaws so that the back of the fish lies in the trough, groove or recess 4b in the conveyor plates 4 and 4a. As the conveyor advances, the cam roller 16 leaves the cam track 17 and the jaws are automatically closed by the closing spring 15 and retracted into their normal position (Fig. 5) by the passage of the arm 22 from beneath the ramp 22 and the engagement of the arm 23 on the jaw spindle 10 with the underneath stationary abutment or ramp 21, which extends almost the whole length of the machine, to hold the jaws down while the fish is carried past the dressing tools. The tail-gripping jaws thus present no obstruction or danger of damage to the tools. Finally the jaws are again raised and opened to release the fish, the raising and opening of the jaws being effected in a manner similar to that already described, viz., the arm 23 rides off the ramp 21, thereby allowing the ramp 20a to turn the arm 22 and raise the jaws to the position shown in Fig. 6, while the cam track 18 engages the cam rollers 17 and opens the jaws, thus allowing the fish to be discharged over the end of the conveyor. As the jaws 6 and 7 continue their forward travel without holding a fish between them, the movement of the jaws does not require to be further controlled until they again return beneath the ramp 20.

It will be seen that by the foregoing construction the tail-gripping jaws are turned to an angle of approximately 45 degrees to the body of the fish to feed the fish to the jaws. The same result may however be attained as indicated in Fig. 7, if the fish is fed to the conveyor at one end of the endless belt conveyor in such a position that it meets the end sprockets at an angle of 45 degrees or thereabouts and in such case the tail-gripping jaws do not require to be raised through the slot at the feeding position, because they will then be in line with the tail-grip plate, which will be disposed at about 45 degrees to the direction in which the fish is being fed to the conveyor. Fig. 7 shows the feed end of a conveyor so constructed. The conveyor plates 4, 4a constructed as hereinbefore described are mounted on endless chains which pass over end sprocket wheels 2, the conveyor being arranged so that its upper run is straight or flat and preferably horizontal or substantially horizontal to pass beneath the required dressing tools. A feed table 24 meets the conveyor at a point at which the conveyor plates assume an angle of 45 degrees or thereabouts to the feed table. The tail-gripping jaws 25 are consequently at an angle to the feed table at this point although in line with the conveyor plate carrying them. The jaws 25 need not therefore turn on pivots at the feeding position, but can be merely caused to open and close in the slot in the conveyor plate. For this purpose the jaws 25 may be similar in construction to the jaws described with reference to Figs. 1-6 with the exception of the omission of the arms 22 and 23, the jaws being prevented from turning about the axis of the spindles 10 and 11 by any suitable means. The opening of the jaws in advance of and until they leave the feeding position is effected by a fixed arcuate cam or ramp 26 which engages a cam roller or rollers 11a on the spindle 11 (Figs. 7 and 8) of one of the jaws, the fixed cam or ramp 26 having its centre of curvature in the centre of the end sprocket 2. The tail-gripping jaws thus always remain in line with or parallel to the conveyor plate carrying them. The cam 26 is supported by a bracket 26a from any convenient part of the frame of the machine, and the spindle 11 fixed to the jaw 6 is slidable through the jaw 7 which is fixed to the bearing 14.

I claim:

1. A tail-gripping device for the conveyor of a fish-dressing machine comprising a pair of jaws mounted for movement towards and away from each other, means for opening and closing said jaws, and means for moving said jaws together to elevate them above and withdraw them below the general level of the conveyor.

2. In a fish-dressing machine, the combination of a conveyor, a tail-gripping device comprising a pair of jaws normally located below the general level of the conveyor and adapted to close upon a fish tail, automatic means for moving said jaws to elevate them above and withdraw them below the general level of the conveyor, and automatic means for opening and closing the jaws when elevated.

3. A tail-gripping device for the conveyor of a fish-dressing machine comprising a pair of jaws mounted for movement towards and away from each other, means for opening and closing said jaws, means for pivoting the jaws to the conveyor in proximity to one of their ends to enable them to be rocked into positions where they are elevated above or withdrawn below the general level of the conveyor, and means for rocking said jaws together about their pivotal attachment to the conveyor.

4. In a fish-dressing machine, the combination of a conveyor having a recess therein to receive the back of a fish and a slot in the bottom of one end of said recess, a pair of jaws located in said slot and normally having their upper edges flush with the bottom of said recess, means for elevating said jaws in the slot and for withdrawing them to normal position, and means for moving said jaws towards and away from each other to open and close the jaws when elevated.

5. In a fish-dressing machine, an endless travelling belt conveyor comprising a series of plates provided with troughs and arranged in sets, one plate of each set having a slot in the bottom of the trough thereof, means for moving said conveyor, means for supporting said plates along their upper run to prevent sagging, a pair of tail-gripping jaws mounted below said slot, and means for opening and closing said jaws.

6. In a fish-dressing machine, an endless travelling belt conveyor comprising sets of longitudinally troughed connected conveyor plates and means connecting said sets together to provide a discharge space between successive sets of plates, each of said sets having one of its plates provided with a slot in the bottom of the troughed portion, a pair of tail-gripping jaws for each of said sets, said jaws being mounted below said slots, and means for opening and closing said jaws as they travel in succession past a predetermined position.

7. In a fish-dressing machine, an endless travelling belt conveyor comprising a series of plates provided with troughs and arranged in sets, one plate of each set having a slot in the bottom of the trough thereof, a pair of tail-gripping jaws mounted below the slot, a conveyor frame having spaced guide rollers for guiding and moving said conveyor in loop form, mechanism on the conveyor and associated with said jaws for opening and closing them, and stationary members on said conveyor frame for cooperating with and actuating said mechanism to open and close said jaws.

8. In a fish-dressing machine, an endless conveyor having a slot in it, a frame supporting said conveyor, a pair of tail-gripping jaws mounted below the slot, mechanism on the conveyor and associated with said jaws for elevating them above the general level of the conveyor and for opening and closing them when elevated, and stationary members on said frame for cooperating with and actuating said mechanism to elevate and withdraw the jaws and to open and close them when elevated.

9. A tail-grip conveyor plate section for the conveyor of a fish dressing machine comprising a plate troughed longitudinally and having a longitudinal slot in the bottom of the trough, a pair of jaws mounted for movement transversely with respect to said plate and beneath the latter and arranged to complete the bottom of the trough, means for mounting said jaws for movement towards and away from each other, and means carried by and projecting from said plate and adapted when actuated to open and close said jaws and to move them transversely with respect to said plate.

10. In a fish-dressing machine, an endless travelling belt conveyor, spaced end guide rollers for guiding and moving said conveyor in loop form, a pair of jaws carried by the conveyor and movable towards and away from each other below a slot in the conveyor, and means for opening said jaws while they are travelling across a feed point situated on one end roller at a point at which the surface of the conveyor where it carries the jaws is at an obtuse angle to the direction in which the fish is fed to the conveyor.

11. A fish-dressing machine as specified in claim 10 having a feed table meeting the end roller at an angle of about 45 degrees.

12. In a fish-dressing machine, an endless conveyor comprising a series of plates provided with troughs and arranged in sets, one plate of each set having a slot in the bottom of the trough thereof, a conveyor frame having spaced end guide rollers for guiding and moving said conveyor in loop form, a pair of tail-gripping jaws below said slot and in line with the conveyor plate, means for moving said jaws towards and away from each other to open and close them with a parallel motion, and a fixed arcuate ramp having its centre of curvature at the centre of one of the end rollers and arranged to cooperate with and actuate the means for opening and closing the jaws.

13. A tail-gripping conveyor plate section for the conveyor of a fish dressing machine comprising a longitudinally troughed plate having a slot in the bottom of one end of the trough, a pair of jaws mounted for parallel movement towards and away from each other below said slot, means for automatically closing said jaws, and means beneath and carried by the conveyor plate for enabling said jaws to be opened.

14. A tail-gripping conveyor plate section for the conveyor of a fish dressing machine comprising a longitudinally troughed plate having a slot in the bottom of one end of the trough, a pair of jaws mounted for parallel movement towards and away from each other below said slot, means for pivotally mounting the jaws to elevate them through the slot, and means projecting from the conveyor plate and carried thereby for rocking said jaws upon their pivot in either direction.

15. In a fish-dressing machine, an endless conveyor comprising a series of plates provided with troughs and arranged in sets, one plate of each set having a slot in the bottom of the trough thereof, means for guiding and traversing said conveyor, a pair of jaws mounted for parallel movement towards and away from each other below said slot, means for automatically closing said jaws and a fixed abutment adapted to cooperate with means for opening said jaws.

JOHN LESLIE ROWTON.